US010287425B2

United States Patent
Ziser et al.

(10) Patent No.: US 10,287,425 B2
(45) Date of Patent: May 14, 2019

(54) COMPOSITIONS, CONTAINING THERMOPLASTICS BASED ON POLYVINYL CHLORIDE AND CONTAINING CROSS-LINKED NBR MICROGELS MODIFIED WITH HYDROXYL GROUPS

(71) Applicant: LANXESS Deutschland GmbH, Cologne (DE)

(72) Inventors: Torsten Ziser, Birkenau (DE); Harald Kleinknecht, Alzey (DE); Lars Wawrzinski, Mannheim (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 14/786,726

(22) PCT Filed: Apr. 25, 2014

(86) PCT No.: PCT/EP2014/058440
§ 371 (c)(1),
(2) Date: Oct. 23, 2015

(87) PCT Pub. No.: WO2014/174068
PCT Pub. Date: Oct. 30, 2014

(65) Prior Publication Data
US 2016/0075867 A1 Mar. 17, 2016

(30) Foreign Application Priority Data

Apr. 26, 2013 (EP) .................................... 13165650

(51) Int. Cl.
*C08L 27/06* (2006.01)
*C08J 3/00* (2006.01)
*C08J 3/24* (2006.01)

(52) U.S. Cl.
CPC .............. *C08L 27/06* (2013.01); *C08J 3/005* (2013.01); *C08J 3/24* (2013.01); *C08J 2309/02* (2013.01); *C08J 2327/06* (2013.01); *C08J 2409/02* (2013.01)

(58) Field of Classification Search
CPC .......... C08L 127/09; C08L 27/09; C08L 9/02; C08J 3/24; C08J 3/005; C08J 2309/02; C08J 2327/06; C08J 2409/02
See application file for complete search history.

(56) References Cited

U.S. PATENT DOCUMENTS

| 2,187,146 | A | 1/1940 | Calcott |
| 4,043,958 | A | 8/1977 | Whelan |
| 5,302,696 | A | 4/1994 | Schiessl |
| 5,362,787 | A | 11/1994 | Ngoc et al. |
| 5,442,009 | A | 8/1995 | Parker et al. |
| 5,552,468 | A | 9/1996 | Ngoc et al. |
| 5,739,203 | A | 4/1998 | Ngoc |
| 6,399,706 | B1 | 6/2002 | Obrecht et al. |
| 8,188,187 | B2 * | 5/2012 | Heiliger ................. C08L 21/00 525/191 |
| 2005/0197443 | A1 | 9/2005 | Ziser et al. |
| 2007/0191545 | A1 | 8/2007 | Heiliger et al. |
| 2007/0232733 | A1 | 10/2007 | Ziser et al. |
| 2008/0249241 | A1 | 10/2008 | Heiliger et al. |

FOREIGN PATENT DOCUMENTS

| JP | 2007506830 A | 3/2007 |
| JP | 2007506831 A | 3/2007 |
| WO | 2014174068 A1 | 10/2014 |

OTHER PUBLICATIONS

Europena Search Report from co-pending Application EP13165650 dated Sep. 24, 2013, 2 pages.

* cited by examiner

*Primary Examiner* — Sanza L. McClendon
(74) *Attorney, Agent, or Firm* — Norris McLaughlin, P.A.

(57) ABSTRACT

The present invention relates to a composition obtainable by mixing to incorporate at least one microgel (B) that has been crosslinked by means of free-radical generators photochemical by using a wavelength>0.1 μm and/or thermally and that contains hydroxy groups and that is based on polybutadiene-acrylonitrile copolymers (NBR) into polyvinyl chloride (PVC) in an extruder, to processes for production thereof and to use thereof for reproduction of transparent thermoplastically processable molded items, and also to molded items produced from the said compositions.

17 Claims, No Drawings

COMPOSITIONS, CONTAINING THERMOPLASTICS BASED ON POLYVINYL CHLORIDE AND CONTAINING CROSS-LINKED NBR MICROGELS MODIFIED WITH HYDROXYL GROUPS

The present invention relates to compositions which comprise at least one thermoplastic based on polyvinyl chloride (A) and which comprise at least one microgel (B) that has been crosslinked by means of free-radical generators photochemically by using a wavelength>0.1 µm and/or thermally, preferably peroxidically, and that contains hydroxy groups and that is based on polybutadiene-acrylonitrile copolymers (NBR), to a process for production thereof and to use thereof for the production of transparent thermoplastically processable moulded items, and also to moulded items produced from the said compositions. The compositions of the invention are transparent and have high tensile strain at break and have excellent impact resistance.

U.S. Pat. No. 4,043,958 describes NBR-rubber-PVC-iron oxide mixtures which have particular flame retardancy properties. The said NBR-rubber mixtures are, however, merely mixtures of uncrosslinked NBR macromolecules.

EP-A 1664158 discloses the use of modified microgels in crosslinkable media. However, this production route is not applicable to PVC because of the low boiling point (about −14° C.) and the carcinogenic nature of vinyl chloride.

EP-A 1670851 describes the use of microgels in organic media. The work in that document focuses on the use of SBR gels in systems based on polypropylene (PP).

A disadvantage here, however, is that the NBR/PVC phases have purely physical linkage, and this is a disadvantage because of the small interaction forces, in comparison with chemical linkage. On exposure to mechanical stress, the physical linkage breaks, and premature mechanical failure occurs.

Furthermore, large amounts of microgels are needed in order to obtain thermoplastic elastomers with good property profiles. In the case of low-cost thermoplastics, especially PVC, this greatly increases the price of the product.

High proportions of microgels moreover lead to materials that are always opaque.

These approaches cannot serve the large market for higher-price, transparent PVC products that can be coloured.

It was therefore an object of the present invention to provide transparent microgel-containing compositions comprising thermoplastics based on polyvinyl chloride (PVC) which have high tensile strain at break and have excellent impact resistance.

The novel compositions are moreover intended to be amenable to industrial-scale production and to pose no problems in relation to health and safety at work.

Another intention was that when the compositions are exposed to impact-type stress there are none of the breakaway effects between matrix and disperse phase that give poorer values for mechanical properties, swelling behaviour and stress-cracking corrosion, etc. The intention was that the production of the microgels for the compositions be simple and that it permit adjustment of the particle size distributions of the microgel particles in a controlled manner that extends to very small median particle sizes.

Surprisingly, it has now been found that the object according to the invention can be achieved via compositions which comprise at least one thermoplastic based on polyvinyl chloride (A) and which comprise at least one microgel (B) that has been crosslinked by means of a free-radical generator photochemically by using a wavelength>0.1 µm and/or thermally, preferably peroxidically, and that contains hydroxy groups and that is based on polybutadiene-acrylonitrile copolymers (NBR).

The compositions of the invention feature high tensile strain at break and excellent impact resistance, and very good compatibility and dispersion. The latter also provides high transparency.

The desired properties of the resultant thermoplastics can moreover be controlled via the selection of particular microgels. It is also possible to adjust the glass transition temperature of the dispersed microgels in a controlled manner within the limits of −60° C. up to less than 50° C., and this in turn permits controlled adjustment of the properties of the resultant thermoplastics. It is thus also possible to adjust the difference of the glass transition temperatures between disperse phase and continuous phase in a controlled manner; it can by way of example be from 0° C. to 250° C.

The compositions of the invention can moreover be produced via a simple process on an industrial scale.

The present invention therefore provides compositions which comprise at least one thermoplastic based on polyvinyl chloride (A) and which comprise at least one microgel (B) that has been crosslinked by means of free-radical generators photochemically by using a wavelength>0.1 µm and/or thermally, preferably peroxidically, and that contains hydroxy groups and that is based on polybutadiene-acrylonitrile copolymers (NBR).

Thermoplastics (A)

The thermoplastics based on polyvinyl chloride (PVC) (A) are commercially available polymers which by way of example are obtainable as Troilit® from GRANULAT 2000 Kunststoff Compound GmbH & Co KG. The types of PVC (A) that can be used in the thermoplastic thermoplastic-microgel composition of the invention include by way of example standard PVC, and also copolymers thereof. It is possible here to use either rigid PVC or else flexible PVC, preference being given here to rigid PVC.

PVC is classified as rigid PVC or flexible PVC.

Mechanical and electrical properties are as follows:

| Parameter compared | PVC-U (rigid PVC) | PVC-P (flexible PVC) |
|---|---|---|
| Density in g/cm$^3$ | 1.38-1.40 | 1.20-1.35 |
| Tensile strength in N/mm$^2$ (in accordance with DIN 53455) | 50-75 | 10-25 |
| Tensile strain at break/tensile strength in % (in accordance with DIN 53455) | 10-50 | 170-400 |

The PVC used for the purposes of the invention can comprise plasticizers and also stabilizers and also other additives, preferably antioxidants, metal deactivators, light stabilizers, preferably barium/cadmium salts, organotin carboxylates, 2-hydroxyphenylbenzotriazoles, 2-hydroxybenzophenones, oxanilides and HALS compounds (HALS=Hindered Alkoxyamine Light Stabilizers), plasticizers, PVC stabilizers, lubricants, PVC processing aids, impact-resistance improvers, fillers and reinforcing agents, fibres, colorants, flame retardants and antistatic agents.

In a preferred embodiment of the invention, the polyvinyl chloride (PVC) used comprises no plasticizers.

Microgels (B)

The microgel (B) used in the composition of the invention is a microgel (B) that has been crosslinked by means of free-radical generators photochemically by using a wavelength>0.1 μm and/or thermally, preferably peroxidically, and that contains hydroxy groups.

In the primary particles of the microgel (B) present in the composition of the invention, the difference between the diameters of an individual primary particle, defined as $$[(d1-d2)/d2] \times 100\%,$$

where d1 and d2 are any two desired diameters of the primary particle and d1>d2, is preferably less than 500%, more preferably less than 100%, still more preferably less than 80%, very particularly preferably less than 50%.

If is preferable that in at least 80%, more preferably at least 90%, still more preferably at least 95% of the primary particles of the microgel the difference between the diameters, defined as $$[(d1-d2)/d2] \times 100\%,$$

where d1 and d2 are any two desired diameters of the primary particle and d1>d2, is preferably less than 500%, preferably less than 100%, more preferably less than 80%, very particularly preferably less than 50%.

The abovementioned difference between the diameters of the individual particles can be determined by the following method. A thin section of the solidified composition of the invention is first produced. A transmission electron micrograph is then produced at a magnification of by way of example 10 000× or 200 000×. Within an area of 833.7× 828.8 nm, the largest and the smallest diameter is determined as d1 and d2 on ten primary microgel particles. If in at least 80%, more preferably at least 90%, still more preferably at least 95%, of the primary microgel particles measured the difference defined above is in each case below 250%, more preferably below 100%, still more preferably less than 80%, still more preferably below 50%, the primary microgel particles exhibit the difference feature defined above.

If the concentration of the microgels in the composition is so high that there is a large extent of overlap of the visible primary microgel particles, ease of evaluation can be improved by prior appropriate dilution of the measurement sample.

In a preferred embodiment of the invention, the geometry of the primary particles of the microgel (B) on production of the same is approximately spherical, meaning that the difference between d1 and d2 is <50%, preferably <10%.

In accordance with DIN 53206:1992-08 the expression primary particles means the microgel particles dispersed in the coherent phase and discernible individually via suitable physical methods (electron microscope).

The median diameter $d_{50}$ of the microgels produced can be adjusted with high precision by way of example to 0.1 micrometer (100 nm)+0.01 micrometer (10 nm), in such a way as to achieve by way of example a particle size distribution in which the size of at least 75% of all of the microgel particles is from 0.095 micrometer to 0.105 micrometer. Other median diameters of the microgels, in particular in the range from 5 to 500 nm, can be produced and used with equal precision (where at least 75% by weight of all the particles lie in the region of the maximum of the grain size distribution curve (determined by light scattering) in a range extending 10% above and below the maximum). It is thus possible to achieve practically "pinpoint" adjustment of the morphology of the microgels dispersed in the composition of the invention, and thus to adjust the properties of the composition of the invention, and also of the plastics by way of example produced therefrom.

In the composition of the invention, the median diameter $d_{50}$ of the primary particles of the microgel (B) is preferably from 5 to 500 nm, more preferably from 20 to 400 nm, further preferably from 20 to 300 nm, particularly preferably from 20 to 250 nm, still more preferably from 20 to 99 nm, very particularly preferably from 40 to 80 nm (diameter data in accordance with DIN 53206). The production of particularly fine-particle microgels via emulsion polymerization is achieved via control of the reaction parameters in a manner known per se (see by way of example H. G. Elias, Makromoleküle, Band 2, Technologie [Macromolecules, Volume 2, Technology], 5th edition, 1992, page 99).

Since the morphology of the microgels in essence does not alter during the further processing of the composition of the invention, or can be re-established via heat-conditioning, the median particle diameter of the dispersed primary particles in essence corresponds to the median particle diameter of the dispersed primary particles in the further-processed products obtained by using the composition of the invention, for example, plastics comprising microgel.

In this way it is possible to provide, in the form of pellets, storage-stable microgel formulations that are to some extent tailored, which have a defined morphology, i.e. good dispersion of the microgels, and which can easily be further processed by users in the desired applications. There is no longer any need for prior complicated dispersion, homogenization, or indeed production of the microgels, and it is therefore likely that microgels of this type will also be used in sectors where their use appeared hitherto to be excessively complicated.

In the composition of the invention, the microgels (B) preferably comprise at least about 30% by weight of fractions (gel content) insoluble in toluene at 23° C., more preferably at least about 70% by weight, more preferably at least about 80% by weight, still more preferably at least about 90% by weight.

The fraction insoluble in toluene is determined here in toluene at 23° C.

For this, 250 mg of the microgel are swollen in 20 ml of toluene for 24 hours at 23° C. with shaking. After centrifuging at 20 00 rpm the insoluble fraction is isolated and dried. The gel content is calculated by dividing the amount of the dried residue by the starting weight and is stated in percent by weight.

In the composition of the invention, the swelling index of the microgels (B) in toluene at 23° C. is preferably less than about 80, more preferably less than 60, still more preferably less than 40. The swelling indices of the microgels (Qi) can therefore particularly preferably be from 1 to 15 and 1 to 10. The swelling index is calculated from the weight of the solvent-containing microgel swollen for 24 hours in toluene at 23° C. (after centrifuging at 20 000 rpm) and the weight of the dry microgel:

Qi=wet weight of microgel/dry weight of microgel.

The swelling index is determined by swelling 250 mg of the microgel in 25 ml toluene for 24 h with shaking. The gel is isolated by cenfrifuging, and is weighed and is then dried at 70° C. to constant weight and again weighed.

In the composition of the invention, the glass transition temperatures Tg of the microgels (B) are preferably from −60° C. to +50° C., more preferably from −50° C. to +25° C., still more preferably from −40° C. to −15° C. In rare cases if is also possible to use microgels which by virtue of their high degree of crosslinking have no glass transition temperature.

The breadth of the glass transition of the microgels (B) used in the composition of the invention is moreover preferably greater than 5° C., preferably greater than 10° C., more preferably greater than 20° C. Microgels which exhibit this type of breadth of glass transition do not generally have completely homogeneous crosslinking—unlike completely homogenously radiation crosslinked microgels. The modular change from the matrix phase to the disperse phase in the plastics compositions comprising microgel and produced by way of example from the compositions of the invention is thus not immediate. No break-away effects therefore occur between matrix and disperse phase when the said compositions are exposed to impact-type stress, and there is therefore an advantageous effect on mechanical properties, swelling behaviour and stress-cracking corrosion, etc.

The glass transition temperatures (Tg) and the breadth of the glass transition (ΔTg) of the microgels are determined by differential scanning calorimetry (DSC) under the following conditions:

Tg and ΔTg are determined by carrying out two cooling/heating cycles. Tg and ΔTg are determined in the second heating cycle. The determinations used 10-12 mg of the selected microgel in a DSC sample holder (standard aluminium pan) from Perkin-Elmer. The first DSC cycle is carried out by first cooling the sample with liquid nitrogen to −100° C. and then heating it at a rate of 20K/min to +150° C. The second DSC cycle is begun by immediately cooling the sample as soon as the sample has reached a temperature of +150° C. The cooling takes place at a rate of about 320 K/min, in the second heating cycle, the sample is heated again as in the first cycle to +150° C. The heating rate in the second cycle is again 20K/min. Tg and ΔTg are determined graphically on the DSC curve for the second heating procedure. To this end, three straight lines are drawn onto the DSC curve. The 1st straight line is drawn on the portion of the DSC curve below Tg, the 2nd straight line is drawn on the curve section with inflection point that passes through Tg and the 3rd straight line is drawn on the DSC curve section above Tg. Three straight lines with two intersection points are thus obtained. Each of the two intersection points is characterized by a characteristic temperature. The average of these two temperatures gives the glass transition temperature Tg, and the breadth of the glass transition ΔTg is obtained from the difference between the two temperatures.

The microgels that have been crosslinked by means of free-radical generators photochemically by using a wavelength>0.1 μm and that contain hydroxy groups and that are present in the composition of the invention can be produced in a manner known per se, preferably via crosslinking with trimethylolpropane trimethacrylate (TMPTMA), hydroxyethyl methacrylate, acrylonitrile and butadiene. The processes known according to the prior art can be used here, as described by way of example in EP-A-405 216, EP-A-854171, DE-A 4220583, GB Patent 1078400, DE-A 197 01 489, DE-A 197 01 488, DE-A 198 34 804, DE-A 198 34 803, DE-A 198 34 802, DE-A 199 19 459, DE-A 199 39 865, DE-A 199 42 620, DE-A 199 42 614, DE-A 100 21 070, DE-A 100 38 488, DE-A 100 39 749, DE-A 100 52 287, DE-A 100 56 311 and DE-A 100 81 174. The term microgels preferably means rubber particles which in particular are obtained via crosslinking of the following rubbers:

NBR: polybutadiene-acrylonitrile copolymers having acrylonitrile content of from 10 to 80% by weight, preferably from 15 to 35% by weight, particularly preferably from 20 to 30% by weight, and also X-NBR: carboxylated nitrile rubbers.

The uncrosslinked starting materials for the microgels are preferably produced by the following methods:
1. emulsion polymerization,
2. solution polymerization of rubbers which are not accessible by way of variant 1.

The microgels (B) used in the composition of the invention are preferably those that are obtainable via emulsion polymerization.

The production of the microgels used according to the invention and based on polybutadiene-acrylonitrile copolymers (NBR) via emulsion polymerization uses by way of example the following monomers polymerizable by a free-radical route: butadiene, styrene, acrylonitrile, isoprene, esters of acrylic and methacrylic acid, 2-chlorobutadiene, 2,3-dichlorobutadiene, preferably butadiene and acrylonitrile, and also carboxylic acids containing double bonds, preferably acrylic acid, methacrylic acid, maleic acid, itaconic acid etc., hydroxy compounds containing double bonds, preferably hydroxyethyl methacrylate, hydroxyethyl acrylate, hydroxybutyl methacrylate, amine-functionalized (meth)acrylates, etc.

The crosslinking of the rubber gel can be achieved directly during the emulsion polymerization process, via copolymerization with polyfunctional compounds that have crosslinking action, or via subsequent crosslinking, as described below. The direct crosslinking is a preferred embodiment of the invention. Preferred polyfunctional comonomers are compounds having at least two, preferably 2 to 4, copolymerizable C=C double bonds, preferably divinylbenzene. It is moreover possible to use the acrylates and methacrylates of polyhydric, preferably di- to tetrahydric $C_2$ to $C_{10}$-alcohols, preferably ethylene glycol, 1,2-propanediol, butanediol, hexanediol, polyethylene glycol having from 2 to 20, preferably from 2 to 8 oxyethylene units, neopentyl glycol, bisphenol A, glycerol, trimethylolpropane, pentaerythritol.

The crosslinking to give rubber microgels during the emulsion polymerization process can also take place via continuation of the polymerization until high conversions are reached, or in the monomer-feed process via polymerization with high internal conversions. Another possibility also consists in the conduct of the emulsion polymerization process in the absence of regulators.

For the crosslinking of the uncrosslinked or of the weakly crosslinked starting materials for the microgels after the emulsion polymerization process it is best to use the latices that are obtained during the emulsion polymerization process. In principle, this method can also be used for non-aqueous polymer dispersions which are accessible by other means, for example preferably via solvent replacement. Natural rubber latices can also be crosslinked in this way.

Examples of suitable chemicals having thermal crosslinking effect are organic peroxides, preferably dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl) peroxide, tert-butyl perbenzoate and/or organic azo compounds, preferably azobisisobutyronitrile and azobiscyclohexanenitrile and/or di- and polymercapto compounds, preferably dimercaptoethane, 1,6-dimercaptohexane, 1,3,5-trimercaptotriazine and mercapto-terminated polysulfide rubbers, preferably mercapto-terminated reaction products of bischloroethyl formal with sodium polysulfide, as thermal free-radical initiator.

The ideal temperature for carrying out the post-crosslinking process naturally depends on the reactivity of the crosslinking agent; it can be carried out at temperatures from room temperature up to about 180° C. optionally under elevated pressure (in this connection see Houben-Weyl, Methoden der organischen Chemie [Methods of organic chemistry], 4th edition, Volume 14/2, page 848). Peroxides are particularly preferred as crosslinking agents.

The crosslinking of rubbers comprising C=C double bonds to give microgels can also take place in dispersion or emulsion with simultaneous, partial, or optionally complete, hydrogenation of the =C double bond via hydrazine as described in U.S. Pat. No. 5,302,698 or U.S. Pat. No. 5,442,009 or optionally other hydrogenating agents, such as organometal hydride complexes.

Particle enlargement via agglomeration can optionally be carried out prior to, during or after the post-crosslinking process.

Rubbers which are produced via solution polymerization can also serve as starting materials for the production of the microgels. In these cases, the solutions of the said rubbers in suitable organic solvents are used as starting materials.

To produce the desired sizes of the microgels, suitable assemblies are used to mix the rubber solution in a liquid medium, preferably in water optionally with addition of suitable surface-active auxillaries, for example preferably surfactants, in such a way as to give a dispersion of the rubber in the appropriate particle size range. For the crosslinking of the dispersed solution rubbers, the procedure is as described above for the subsequent crosslinking of emulsion polymers. Suitable crosslinking agents are the abovementioned chemicals having thermal crosslinking effect, and the solvent used for the production of the dispersion can optionally be removed by way of example through distillation before the crosslinking process.

Particularly preferred methods for the production of hydroxy-functional microgels based on NBR are grafting of the NBR-containing microgels with hydroxy-functional monomers, and also the reaction with low-molecular weight agents.

For the grafting of the microgels with hydroxy-functional monomers, it is preferable to start from the aqueous microgel dispersion, which is reacted with polar monomers, preferably hydroxyethyl (meth)acrylate, hydroxypropyl (meth)acrylate, hydroxybutyl (meth)acrylate under the conditions of a free-radical emulsion polymerization process. Microgels with a core/shell morphology are thus obtained, and the intention here is that the shell have high compatibility with the matrix. It is desirable that the monomer used in the modification step achieves maximum degree of grafting onto the unmodified microgel. It is preferable that the functional monomers are added to the material prior to complete crosslinking of the microgels.

In principle, grafting of the microgels in non-aqueous systems is also conceivable, and this method also permits modification with monomers via ionic polymerization methods.

The hydroxy group content of the microgels, as hydroxy number with the dimension mg KOH/g of polymer, is determined in accordance with DIN 53240 via reaction with acetic anhydride and use of KOH for titration of the acetic acid thus liberated. The hydroxy number of the microgels is preferably from 0.1 to 100 mg KOH/g of polymer, more preferably from 0.5 to 50 mg KOH/g of polymer.

The amount of the modifier used depends on the effectiveness thereof and on the requirements prevailing in the particular case and is in the range from 0.05 to 30% by weight, based on the total amount of rubber microgel used, particular preference being given to an amount of from 0.5 to 10% by weight, based on the total amount of rubber gel.

The modifying reactions can be carried out at temperatures of from 0 to 180° C., preferably from 20 to 95° C., optionally under a pressure of from 1 to 30 bar. The modifying processes can be undertaken on microgels in bulk or in the form of dispersion thereof, and in the latter case, it is possible to use inert organic solvents or else water as reaction medium. The modification process is particularly preferably carried out in aqueous dispersion of the crosslinked rubber.

The work-up of the resultant NBR-based microgels by way of example can be achieved via concentration by evaporation, via coagulation, via coagulation with another latex polymer, via freeze-coagulation (cf. U.S. Pat. No. 2,187,146) or via spray drying. In the case of the work-up via spray drying, it is also possible to add commercially available flow aids, such as $CaCO_3$ or silica.

The invention also includes the use of the composition of the invention as what is known as masterbatch (concentrate) for incorporation into thermoplastic materials. These masterbatches naturally have high microgel concentrations, preferably of more than 30% by weight.

The compositions of the invention are obtainable by mixing of at least one thermoplastic based on PVC (A) and at least one microgel (B) that has been crosslinked by means of a free-radical generator photochemically by using a wavelength>0.1 μm and/or thermally, preferably peroxidically, and that contains hydroxy groups, and that is based on polybutadiene-acrylonitrile copolymers (NBR), by means of an extruder.

For the purposes of the invention, extruders that can be used are mixing extruders. Mixing assembly used preferably comprises the extruders known from plastics technology and rubber technology (Saechtling Kunststoff Taschenbuch [Plastics Handbook], 24th edition, p. 61 and p. 148 ff; DIN 24450; Mischen von Kunststoff-und Kautschukprodukten [Mixing of plastics products and rubber products], VDI Kunststofftechnik, p. 241 ff), examples being single-screw extruders (with specific mixing elements), twin-screw extruders, cascade extruders, vented extruders, multi-screw extruders, pin-barrel extruders, and planetary-gear extruders. It is preferable to use vented co-rotating twin-screw extruders (vented planetary-gear extruders).

The ratio by weight of PVC thermoplastic (A) to microgel (B) in the composition of the invention is preferably from 99:1 to 60:40, with preference from 98:2 to 75:25, with particular preference from 97:3 to 85:15.

The invention also provides compositions obtainable by mixing of at least one thermoplastic based on polyvinyl chloride (A) and of at least one microgel (B) that has been crosslinked by means of a free-radical generator photochemically by using a wavelength>0.1 μm and/or thermally, preferably peroxidically, and that contains hydroxy groups, and that is based on polybutadiene-acrylonitrile copolymers (NBR).

Production of the Compositions of the Invention

The present invention further provides a process for production of the compositions of the invention by mixing of at least one thermoplastic based on polyvinyl chloride (PVC) (A) and at least one microgel (B) that has been crosslinked by means of a free-radical generator photochemically by using a wavelength>0.1 μm and/or thermally, preferably peroxidically, and that contains hydroxy groups, and that is based on polybutadiane-acrylonitrile copolymers (NBR), by means of an extruder. The compositions of the invention are generally produced in such a way that the microgel (B) is produced separately prior to mixing with the PVC (A).

Suitable mixing assemblies are preferably mixing extruders. Mixing assembly used preferably comprises the extruders known from plastics technology and rubber technology (Saechtling Kunststoff Taschenbuch [Plastics Handbook], 24th edition, p. 81 and p. 148 ff; DIN 24450; Mischen von Kunststoff-und Kautschukprodukten [Mixing of plastics products and rubber products], VDI Kunststofftechnik, p. 241 ff), examples being single-screw extruders (with specific mixing elements), twin-screw extruders, cascade extruders, vented extruders, multi-screw extruders, pin-barrel extruders, and planetary-gear extruders. It is preferable to use vented co-rotating twin-screw extruders (vented planetary-gear extruders).

The further blending of the compositions of the invention made of modified microgel (B) and of the PVC (A) with additional filters, and also optionally with conventional auxiliaries, as mentioned above can be carried out in conventional mixing extruders. Preferred mixing temperatures are from room temperature (23° C.) to 280° C., preferably about 60° C. to 200° C.

The invention further provides the use of the compositions of the invention for the production of thermoplastically processable moulded items, and also the moulded items obtainable from the compositions of the invention. Examples of moulded items of this type include: plug connectors, attenuating elements, in particular vibration-damping and shock-absorbing elements, acoustic damping elements, profiles, foils, in particular attenuating foils, floor mats, apparel, in particular shoe inserts, shoes, in particular ski boots, shoe soles, electronic components, housings for electronic components, tools, decorative mouldings, composite materials, moulded parts for automobiles, etc.

The moulded items of the invention can be produced from the compositions of the invention via conventional methods of processing for thermoplastics-microgels, preferably via melt extrusion, calendering, injection moulding (IM), compression moulding (CM), and reaction injection moulding (RIM).

The scope of the invention covers all of the moiety definitions, indices, parameters and explanations mentioned above and listed hereinafter in general terms or in preferred ranges in combination with one another, i.e. also in any desired combination of the respective ranges and preferred ranges.

The examples hereinafter provide further explanation of the present invention. However, the disclosure in the examples does not restrict the invention.

EXAMPLES

Starting Materials
Baymod® N XL 38.43, an unmodified NBR rubber from Lanxess Deutschland GmbH.
Nanoprene® B M75-OH-VP, a peroxidically crosslinked, nanoscale BR elastomer from Lanxess Deutschland GmbH, modified with hydroxy groups.
Polyvinyl chloride (PVC, Troilit®1003), a PVC from GRANULAT 2000 Kunststoff Compound GmbH & Co. KG.
EDTA=ethylenediaminetetraacetic acid from Merck-Schuchardt.
Iron(II) sulphate•7H$_2$O from Merck-Schuchardt.
Diethylhydroxylamine from Sigma Aldrich.
HEMA=hydroxyethyl methacrylate from Sigma Aldrich.
p-Menthane hydroperoxide (Trigonox® NT 50) from Akzo-Degussa.
Sodium formaldehyde sulphoxylate hydrate (Rongalit®) from Merck-Schuchardt.
Trisodium phosphate•12H$_2$O from Benckiser.
Trimethylolpropane trimethacrylate (TMPTMA) from Lanxess Deutschland GmbH.
Mersolat® K30/95: the Na salts of a mixture of long-chain alkylsulphonic acids from Bayer MaterialScience AG.

1. Production of Microgels (B)

Production example 1 for NBR-based microgel containing hydroxy groups and derived from thermal/peroxidic crosslinking by means of TMPTMA (Micromorph® 20).

Production of the microgel used the following monomers in the stated ratios by weight: 68.8% by weight of butadiene, 26.7% by weight of acrylonitrile, 3.0% by weight of TMPTMA and 1.5% by weight of HEMA.

172 g of Mersolat® K30/95 were dissolved in 12.427 kg of water and used as initial charge in a 40 l autoclave. The autoclave was evacuated three times and filled with nitrogen. 2957 g of butadiene, 1150 g of acrylonitrile, 129 g of TMPTMA (90%), 64.5 g of HEMA (96%) were then added. The reaction mixture was heated to 30° C. with stirring. An aqueous solution composed of 45 g of water, 500 mg of EDTA, 500 mg of iron(II) sulphate•7H$_2$O, 1.00 g of sodium formaldehyde sulphoxylate hydrate (Rongalit® Merck-Schuchardt) and 1.5 g of trisodium phosphate•12H$_2$O were then added to the mixture.

The reaction was initiated via addition of 3.0 g of Trigonox® NT 50 in 200 g of water, and 185 g of water were used subsequently here for flushing. After a reaction time of 2.5 hours, the reaction temperature was increased to 40° C. After a reaction time of a further hour, 350 mg of Trigonox® NT 50, which had been dissolved in an aqueous solution of 25 g of water and 1.25 g of Mersolat K30/95, were used for post-activation. The polymerization temperature here was increased to 50° C. Once conversion>95% had been achieved, the polymerization process was terminated via addition of an aqueous solution of 53 g of diethylhydroxylamine dissolved in 100 g of water. Unconverted monomers were then removed from the latex by stripping with steam The latex was filtered and, as in Example 2 of U.S. Pat. No. 6,399,706, stabilizer was admixed, and the latex was coagulated and dried.

Prior to use of the microgel, it was dried to constant weight at 100 mbar in a Vacutherm VT 6130 vacuum drying oven from Heraeus Instruments.

TABLE 1

| Production example | Microgel type | Proportion of TMPTMA for crosslinking [phr] | $d_{50}$ [nm] | $O_{spec}$ [m$^2$/g] | Density [g/cm$^3$] | Gel content [% by weight] | Qi | Tg [° C.] | ΔTg [° C.] | OH number [mg KOH/g of pol.] | Acid number |
|---|---|---|---|---|---|---|---|---|---|---|---|
| 1 | OH-NBR | 3 | 64 | 102 | 0.974 | 92 | 8 | −34 | 11 | 7 | 7 |
| 2 | OH BR | 4 | 51 | 127 | 0.929 | 92 | 13 | −76 | 13 | 28 | 7 | phr: parts per 100 rubber

Test Methods:

The following test methods were used to determine the physical parameters of the microgel latices produced:

$d_{50}$: the definition of the diameter $d_{50}$ in accordance with DIN 53 206 is the value for half of all of the particle sizes. The diameter of the latex particles is determined by means of an ultracentrifuge (W. Scholtan, H. Lange, "Bestimmung der Teilchengrößen-verteilung von Latices mit der Ultrazentrifuge" [Determination of the particle size distribution of latices with an ultracentrifuge], Kolloid-Zeitcchrift und Zeitschrift für Polymere (1972) Volume 250, Issue 8). The diameter data in the latex and for the primary particles in the compositions of the invention are practically identical, since the size of the microparticles undergoes practically no change during the production of the composition of the invention.

$O_{spec}$: specific surface area in m²/g density: in g/cm³ at 20° C.

Gel Content

The gel content corresponds to the fraction insoluble in toluene at 23° C. It was determined as described above.

Swelling Index

Qi (swelling index)=wet weight of microgel/dry weight of microgel. The swelling index Qi was determined as follows:

the swelling index was calculated from the weight of the solvent-containing microgel swollen for 24 hours in toluene at 23° C. and the weight of the dry microgel:

the swelling index is determined by swelling 250 mg of the microgel in 25 ml toluene for 24 h with shaking. The toluene-swollen (wet) gel was weighed after centrifuging at 20 000 rpm, and then was dried to constant weight at 70° C. and again weighed (dry microgel).

Glass transition temperature Tg: DSC-2 equipment from Perkin-Elmer was used to determine Tg.

Breadth of glass transition ΔTg: DSC-2 equipment from Perkin-Elmer was used to determine ΔTg.

OH Number (Hydroxy Number)

OH number (hydroxy number) was determined in accordance with DIN 53240, and corresponds to the amount of KOH in mg that is equivalent to the amount of acetic acid liberated when 1 g of substance is acetylated with acetic anhydride.

Acid Number

Acid number was determined in accordance with DIN 53402, and corresponds to the amount of KOH in mg that is required to neutralize 1 g of the polymer.

2. Production of the Microgel-Containing Compositions and Characterization Thereof Example 1

A material available for purchase in the market for purposes of PVC-modification, namely Baymod® N XL 38.43, was used as reference in relation to the thermoplastics-microgel compositions.

The microgel-containing compositions were produced in a twin-screw extruder (ZSK 27 HP, manufacturer Leistritz; screw diameter d=27 mm, L/D>56) with corotating screws. The mixing took place at a rotation rate of 300 rpm and with a throughput of 15 kg/h. The temperature profile of the extruder zones (L/D ratio per zone=4), abbreviated to Z, was: Z00=cooled, Z01=160° C., Z02=170° C., Z03=170° C., Z04=160° C., Z05=150° C., Z06=145° C., Z07=145° C., Z08=145° C., Z09=145° C., Z10=145° C., Z11=145° C., Z12=145° C., Z13=15° C., Z14=160° C. Mixtures of Micromorph® 20P/Troilit® 1003, Nanoprene® B M75-OH-VP/Troilit® 1003 and Baymod® N XL 38.43/Troilit® 1003 were produced in a ratio by weight of respectively 5/95%, 10/90%, 15/85%; for reference, the same procedure was used but only with Troilit® 1003. The extrusion process was identical for all of the mixtures. For this, the Troilit® 1003 was first continuously charged to the extruder zone Z00 by way of a gravimetric metering balance. The respective Micromorph was then added continuously to the extruder by means of a side-feed unit in Z05 by using a further gravimetric metering balance. After the extrusion process, two visually homogeneous strands were passed into a water bath for cooling and were pelletized by means of a strand pelletizer.

Infection Moulding:

After drying of the materials, these were processed to give standard F3 tensile specimens in an Arburg Allrounder 320S injection-moulding machine. The machine temperature was 195° C., with a backpressure of 5 bar and a mould temperature of 80° C.

The following test methods were used for all of the specimens mentioned below in the Examples:

Shore D Hardness

The test specimens were conditioned at RT for 1 h prior to the test. The specimens with microgel exhibit no significant changes of Shore A hardness within the bounds of accuracy of measurement. Table 2 collates the values determined.

Tensile Test

The tensile test took place on standard F3 test specimens (see above) in accordance with DIN 53455. The test was carried out with a universal tester (Frank 1445) with optical length sensors. The measurement range of the force sensor was from 0 to 1000 N. Table 2 collates the results of the tests.

The machine-parameter settings here were as follows:

preloading force: 0.1 N velocity during application of preloading force: 1 mm/min load: 1000N test velocity: 200 mm/min Notched Impact Resistance:

In order to determine the capability of the materials to resist impact-type (dynamic) stress, HIT5.5P equipment from Zwick/Roell with a 4 J Charpy pendulum was used at room temperature to carry out a notched-impact-resistance analysis on the materials. Appropriate peripheral equipment from Zwick/Roell was used to produce the notch in accordance with standard.

The compositions/test specimens obtained exhibited the following properties listed in Table 2:

TABLE 2

Results from physical testing of the following materials: Thermoplastics-microgel compositions of the invention (I1 to I3), comparative mixtures (C2 to C4 to C7) and PVC alone (C1)

| Example No. | Materials | NIR (Charpy DIN 53753) (test rig) | Impact resistance | Elongation at break [%] | Shore D hardness |
|---|---|---|---|---|---|
| C1 | Troilit ®1003 | Notched, Charpy 4J pendulum | 3.3 | 3.8 | 81 |
| I1 (NBR) | 5% of Micromorph ® 20[1] | Notched, Charpy 4J pendulum | 6.7 | 4.9 | 82 |
| I2 | 10% of Micromorph ® 20[1] | Notched, Charpy 4J pendulum | 16.8 | 10.6 | 80 |
| I3 | 15% of Micromorph ® 20[1] | Notched, Charpy 4J pendulum | 102.5 | 20.4 | 75 |
| C2 | 5% of N XL 38.43[1] | Notched, Charpy 4J pendulum | 2.7 | 3.7 | 81 |
| C3 | 10% of N XL 38.43[1] | Notched, Charpy 4J pendulum | 3.3 | 4.6 | 83 |
| C4 | 15% of N XL 38.43[1] | Notched, Charpy 4J pendulum | 3.0 | 7.2 | 81 |
| C5 (BR) | 5% of Nanoprene ®B M75-OH-VP[1] | Notched, Charpy 4J pendulum | 3.4 | 8.9 | 78 |
| C6 | 15% of Nanoprene ®B M75-OH-VP1) | Notched, Charpy 4J pendulum | 5.2 | 17.9 | 76 |
| C7 | 15% of Nanoprene ®B M75-OH-VP1) | Notched, Charpy 4J pendulum | 7.1 | 22.9 | 74 |

C = Comparative Example,
I = according to the invention;
[1] remainder was composed of Troilit ® 1003; Nanoprene ® B M-75-OH-VP is a BR microgel From Table 2 if can be seen that both PVC mixtures modified with microgel that contains hydroxy groups are markedly superior not only to the PVC alone but also to the PVC provided with the commercially available product Baymod® N XL 38.43. Addition of 5% of Micromorph® 20 to Troilit® 1003 raises the notched impact resistance by 100%, and addition of 10% of Micromorph® 20 raises the same by 400%, while Shore D hardness was retained.

Example 2—Transparency of the Tensile Specimens Produced

Although the microgel-containing test sheets have an intrinsic colour, the NBR-containing microgels of the invention remained transparent even at 15% microgel content, since they have very good dispersion.

The NBR-microgel-PVC compositions modified with hydroxy groups (I1-I3) exhibited good transparency, whereas the BR-microgel-PVC compositions (C5-C7) and Baymod N XL 38.43-PVC compositions (C2-C4) are opaque.

Is therefore possible with the compositions of the invention to produce materials which in comparison with commercially available products have superior mechanical properties and moreover retain transparency.

What is claimed is:

1. A composition comprising:
   at least one polyvinyl chloride thermoplastic, and
   at least one microgel comprising at least one of: a crosslinked polybutadiene-acrylonitrile copolymer microgel that contains hydroxy groups, and a crosslinked, carboxylated, polybutadiene-acrylonitrile copolymer microgel that contains hydroxy groups, wherein the microgel is thermally cross-linked using organic peroxides, as thermal free-radical initiator.

2. The composition according to claim 1, wherein the microgel contains individual primary particles, and the deviation of the diameters of an individual primary particle of the microgel, defined as $[(d1-d2)/d2] \times 100\%$ is smaller than 500%, where d1 and d2 are diameters of the primary particle with the proviso that d1 is >d2.

3. The composition according to claim 1, wherein the median particle size $d_{50}$ of the primary particles of the microgel is 5 to 500 nm.

4. The composition according to claim 1, wherein the crosslinked polybutadiene-acrylonitrile copolymer microgel that contains hydroxy groups, and the crosslinked, carboxylated, polybutadiene-acrylonitrile copolymer microgel that contains hydroxy groups each have an acrylonitrile content of 10% to 80%.

5. The composition according to claim 1, wherein the microgel comprises at least about 70% by weight of fractions insoluble in toluene at 23° C.

6. The composition according to claim 1, wherein:
   the swelling index of the microgel in toluene at 23° C. is less than about 80;
   the glass transition temperature of the microgel is from −60° C. to +50° C.; and
   the breadth of the glass transition range of the microgel is greater than about 5° C.

7. The composition according to claim 1, wherein the microgel is cross-linked using trimethylolpropane trimethacrylate (TMPTMA).

8. The composition according to claim 1, the composition has a thermoplastic/microgel ratio by weight of 99:1 to 60:40.

9. The composition according to claim 1, produced by a method comprising mixing the at least one polyvinyl chloride and the at least one microgel.

10. A process for the production of the composition according to claim 1, the process comprising:
    crosslinking the at least one microgel thermally using organic peroxides to produce at least one crosslinked microgel; and
    mixing the at least one polyvinyl chloride and the at least one crosslinked microgel.

11. A masterbatch for thermoplastic materials, the masterbatch comprising a composition according to claim 1.

12. Moulded items obtained via moulding of a composition according to claim 1.

13. The composition according to claim 1, wherein:
    the microgel contains individual primary particles, and the deviation of the diameters of an individual primary particle of the microgel, defined as $[(d1-d2)/d2] \times 100\%$, where d1 and d2 are diameters of the primary particle with the proviso that d1 is >d2, is smaller than 500%;
    the median particle size $d_{50}$ of the primary particles of the microgel is 5 to 500 nm;

the crosslinked polybutadiene-acrylonitrile copolymer microgel that contains hydroxy groups, and the crosslinked carboxylated, polybutadiene-acrylonitrile copolymer microgel that contains hydroxy groups each have an acrylonitrile content of 10% to 80%;

the microgel comprises at least about 70% by weight of fractions insoluble in toluene at 23° C.;

the swelling index of the microgel in toluene at 23° C. is less than about 80;

the glass transition temperature of the microgel is from −60° C. to +50° C.;

the breadth of the glass transition range of the microgel is greater than about 5° C.; and the composition has a thermoplastic/microgel ratio by weight of 99:1 to 60:40.

14. The composition according to claim 13, wherein:

the acrylonitrile content of the crosslinked polybutadiene-acrylonitrile copolymer microgel that contains hydroxy groups, and the crosslinked, carboxylated, polybutadiene-acrylonitrile copolymer microgel that contains hydroxy groups is 20% to 30%;

the median particle size $d_{50}$ of the primary particles of the microgel is 40 to 80 nm;

the microgel comprises at least about 90% by weight of fractions insoluble in toluene at 23° C.;

the swelling index of the microgel in toluene at 23° C. is 1 to 15;

the glass transition temperature of the microgel is from −40° C. to −15° C.;

the breadth of the glass transition range of the microgel is greater than about 20° C.; and the thermoplastic/microgel ratio is 97:3 to 85:15.

15. A thermoplastic composition comprising:

polyvinyl chloride, and hydroxy-functionalized, polybutadiene-acrylonitrile copolymer microgel, crosslinked with organic peroxides.

16. The thermoplastic composition according to claim 15, wherein the microgel has a hydroxy number of 0.1 to 100 mg KOH/g of polymer as determined in accordance with DIN 53240 via reaction with acetic anhydride and use of KOH for titration of the acetic acid liberated.

17. The thermoplastic composition according to claim 16, wherein the hydroxy number is 0.5 to 50 mg KOH/g of polymer.

* * * * *